US009538330B2

(12) United States Patent
Gao, Jr. et al.

(10) Patent No.: US 9,538,330 B2
(45) Date of Patent: Jan. 3, 2017

(54) SYSTEM AND METHOD FOR SELECTING A WI-FI ACCESS POINT FOR POSITION DETERMINATION

(71) Applicant: QUALCOMM Incorporated, San Diego, CA (US)

(72) Inventors: Weihua Gao, Jr., San Jose, CA (US); Ravi Palanki, Cupertino, CA (US); Wei Chen, San Diego, CA (US); Ashok Bhatia, San Diego, CA (US)

(73) Assignee: QUALLCOMM Incorporated, San Diego, CA (US)

( * ) Notice: Subject to any disclaimer, the term of this patent is extended or adjusted under 35 U.S.C. 154(b) by 556 days.

(21) Appl. No.: 13/972,750

(22) Filed: Aug. 21, 2013

(65) Prior Publication Data
US 2015/0055492 A1 Feb. 26, 2015

(51) Int. Cl.
| | |
|---|---|
| *H04W 4/00* | (2009.01) |
| *H04W 4/02* | (2009.01) |
| *H04W 24/00* | (2009.01) |
| *H04W 48/20* | (2009.01) |
| *G01S 5/02* | (2010.01) |
| *G01S 5/14* | (2006.01) |
| *G01S 13/76* | (2006.01) |
| *H04W 64/00* | (2009.01) |

(52) U.S. Cl.
CPC ............ *H04W 4/023* (2013.01); *G01S 5/0226* (2013.01); *G01S 5/0252* (2013.01); *G01S 5/14* (2013.01); *G01S 13/767* (2013.01); *H04W 24/00* (2013.01); *H04W 48/20* (2013.01); *H04W 64/00* (2013.01)

(58) Field of Classification Search
USPC .......................... 370/293, 330, 331, 338, 252
See application file for complete search history.

(56) References Cited

U.S. PATENT DOCUMENTS

| | | | |
|---|---|---|---|
| 8,391,167 B2 | 3/2013 | Ryu et al. | |
| 2005/0058081 A1 | 3/2005 | Elliott | |
| 2007/0259624 A1 | 11/2007 | Alizadeh-Shabdiz et al. | |
| 2010/0135178 A1* | 6/2010 | Aggarwal ............. | G01S 5/0205 370/252 |

(Continued)

FOREIGN PATENT DOCUMENTS

| | | |
|---|---|---|
| WO | WO-2010059934 A2 | 5/2010 |
| WO | WO-2013009465 A1 | 1/2013 |

OTHER PUBLICATIONS

International Search Report and Written Opinion—PCT/US2014/051755—ISA/EPO—Dec. 22, 2014.

*Primary Examiner* — Zewdu A Beyen
(74) *Attorney, Agent, or Firm* — Kilpatrick, Townsend and Stockton LLP

(57) ABSTRACT

Methods, systems, computer-readable media, and apparatuses for position determination are presented. In some embodiments, a method for position determination includes selecting at least one of a plurality of access points based on a measure of response time variability associated with the at least one access point. The method further includes sending, from a device, a communication to the selected at least one access point. The method also includes receiving, from the selected at least one access point, a response to the communication. The method additionally includes calculating a distance from the device to the selected at least one access point based on a round trip time associated with the response to the communication.

32 Claims, 9 Drawing Sheets

(56) References Cited

U.S. PATENT DOCUMENTS

| | | |
|---|---|---|
| 2011/0110282 A1* | 5/2011 | Wu .................. H04W 52/0235 370/311 |
| 2011/0269478 A1 | 11/2011 | Das et al. |
| 2012/0115508 A1 | 5/2012 | Moeglein et al. |
| 2012/0294231 A1 | 11/2012 | Finlow-Bates et al. |
| 2013/0021912 A1 | 1/2013 | Finlow-Bates et al. |

* cited by examiner

SYSTEM AND METHOD FOR SELECTING A WI-FI ACCESS POINT FOR POSITION DETERMINATION

BACKGROUND

Aspects of the disclosure relate to wireless communication. More specifically, aspects of the disclosure relate to Wi-Fi access point (AP) positioning and navigation systems.

Modern navigation systems have typically used satellite-based global positioning system (GPS) for position determination. However, the recent proliferation of Wi-Fi access points has made it possible for navigation systems to use these access points for position determination, especially in urban areas where there is usually large concentration of Wi-Fi access points. WLAN navigation systems can be advantageous over GPS navigation systems because of limitations of GPS signal coverage. For example, while GPS signals may not be readily available inside a shopping mall, wireless signals generated by Wi-Fi access points inside the shopping mall would be more readily detectable by a mobile communication device.

More specifically, for WLAN navigation systems, the locations of the Wi-Fi access points are used as reference points from which well-known trilateration techniques can determine the location of a mobile device (e.g., a Wi-Fi-enabled cell phone, laptop, or tablet computer). The mobile device can use the round trip time (RTT) of signals transmitted to and from the access points to calculate the distances between the mobile device and the access points. Once these distances are calculated, the location of the mobile device can be estimated using trilateration techniques.

When using RTT techniques to determine the distances between the mobile device and the visible Wi-Fi access points, the geographic locations (e.g., latitude and longitude) of the access points need to be known. A number of online databases can be used to determine the locations of large numbers of actively deployed Wi-Fi access points according to their unique basic service set identifier (BSSID) values. For example, companies including Google©, Skyhook©, Devicescape©, and WiGLE™ have built databases of BSSID values and the geographic locations of the corresponding access points.

However, such WLAN navigation systems are inherently imprecise because different make-and-models of Wi-Fi access points typically have different RTT characteristics. For example, different access point products (even those manufactured by the same company) may have different response times associated with transmitting a beacon signal in response to a probe signal generated by the mobile device. Not knowing the exact response time of a particular access point introduces inaccuracies in the measured RTT. Thus, because of the relatively short broadcast range of Wi-Fi access points (e.g., typically less than 30 meters) in relation to the propagation speed of the Wi-Fi signals, inaccuracies in the calculated RTT resulting from unknown variations in the access points' response times can lead to large errors in the calculated position of the mobile device.

Conventional WLAN navigation and positioning systems typically assume the same estimated RTT characteristics for all APs, irrespective of their make and model. Thus, because distance calculations using RTT techniques depend upon processing delays that are specific to individual access points, which in turn typically vary between devices manufactured by different companies and even between different products produced by the same company, such conventional WLAN navigation systems are prone to errors that hinder their accuracy.

Accordingly, there is a need for a system that can consider the varying RTT delay characteristics of a variety of different Wi-Fi access point devices when determining position information of a mobile device using Wi-Fi access points.

BRIEF SUMMARY

Certain embodiments are described for selecting a Wi-Fi access point for position determination.

In some embodiments, a method for position determination includes selecting at least one of a plurality of access points based on a measure of response time variability associated with the at least one access point. The method further includes sending, from a device, a communication to the selected at least one access point. The method also includes receiving, from the selected at least one access point, a response to the communication. The method additionally includes calculating a distance from the device to the selected at least one access point based on a round trip time associated with the response to the communication.

In some embodiments, the method further includes querying a database comprising a weight assigned to the at least one access point.

In some embodiments, the weight is based at least in part on the measure of response time variability.

In some embodiments, the weight is based at least in part on a media access control address of the at least one access point.

In some embodiments, the response time comprises a signal time and a processing time, and wherein the response time variability is attributed to a variance in the processing time.

In some embodiments, the variance in the processing time is determined using a standard deviation calculation.

In some embodiments, the method further includes determining a position of the device based at least in part on the calculating.

In some embodiments, an apparatus for position determination includes a transceiver configured to send and receive a communication and a processor coupled to the transceiver. The processor is configured to select at least one of a plurality of access points based on a measure of response time variability associated with the at least one access point. The processor is further configured to send, via the transceiver, the communication to the selected at least one access point. The processor is also configured to receive via the transceiver, from the selected at least one access point, a response to the communication. The processor is additionally configured to calculate a distance from the device to the selected at least one access point based on a round trip time associated with the response to the communication.

In some embodiments, an apparatus for position determination includes means for selecting at least one of a plurality of access points based on a measure of response time variability associated with the at least one access point. The apparatus further includes means for sending, from a device, a communication to the selected at least one access point. The apparatus also includes means for receiving, from the selected at least one access point, a response to the communication. The apparatus additionally includes means for calculating a distance from the device to the selected at least one access point based on a round trip time associated with the response to the communication.

In some embodiments, a processor-readable medium includes processor readable instructions configured to cause a processor to select at least one of a plurality of access points based on a measure of response time variability associated with the at least one access point. In some embodiments, the instructions are further configured to cause the processor to send, from a device, the communication to the selected at least one access point. In some embodiments, the instructions are further configured to cause the processor to receive, from the selected at least one access point, a response to the communication. In some embodiments, the instructions are further configured to cause the processor to calculate a distance from the device to the selected at least one access point based on a round trip time associated with the response to the communication.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
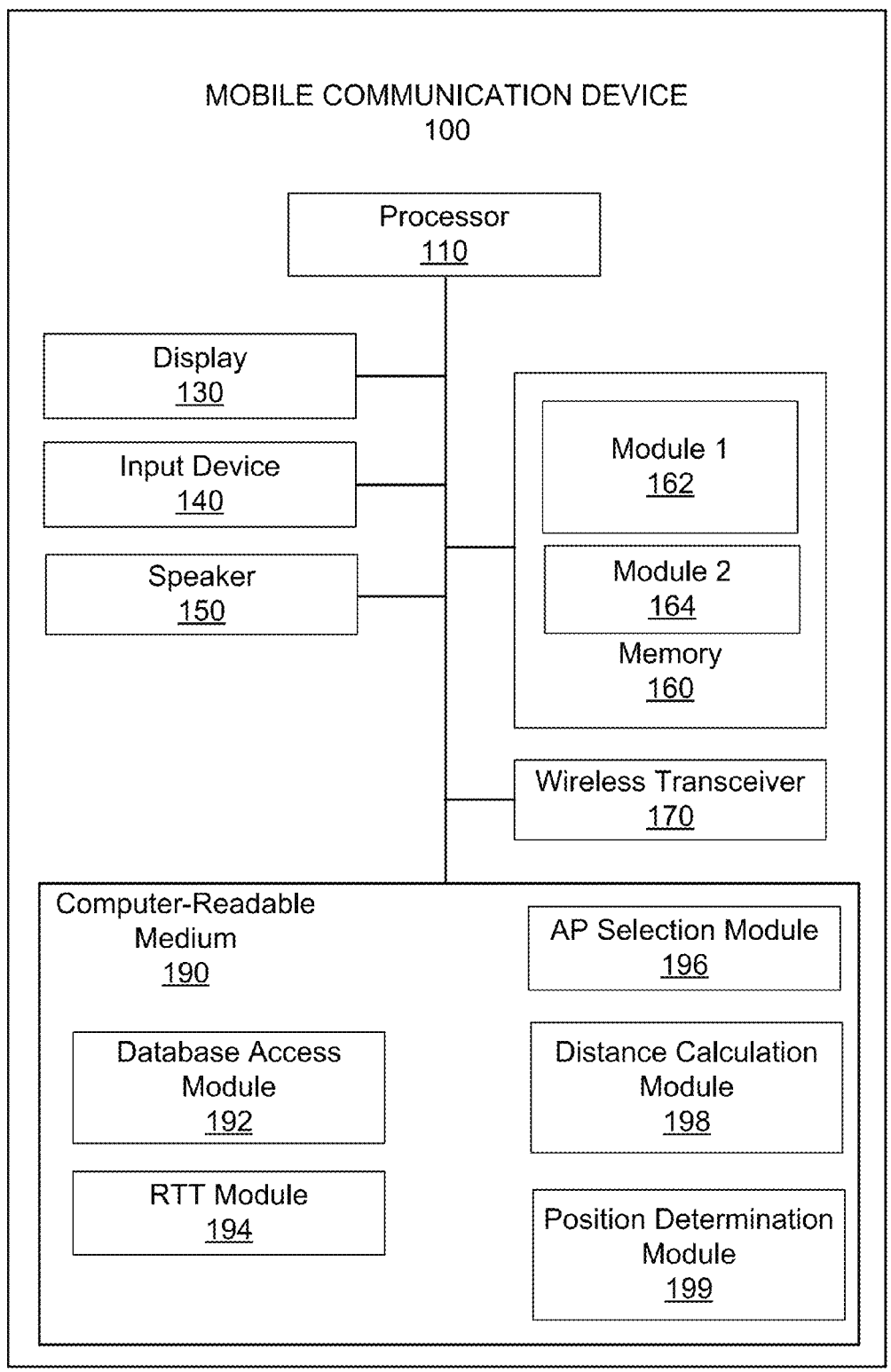
FIG. 1 illustrates a simplified block diagram of a mobile communication device that may incorporate one or more embodiments.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

A method and apparatus for ranking and/or assigning weight to an AP based on a measure of response time variability to a RTT communication are disclosed that improves accuracy of WLAN navigation and positioning systems. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components of circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of myriad physical or logical mechanisms for communication between components. The present embodiments are not to be construed as limited to specific examples described herein but rather to include within their scopes all embodiments defined by the appended claims.

In accordance with present embodiments, a Wi-Fi AP database accessible by mobile communication devices may be configured to store rank and/or weight characteristics assigned to a plurality of actively deployed Wi-Fi APs of various makes and models. The rank and/or weight characteristics may be assigned to the Wi-Fi APs based on a measure of variability in response time to a RTT communication initiated by the mobile communication device. An AP's response time to a RTT communication may include, but is not limited to, a signal time and a processing time. The signal time may be the "over-the-air" time of the signal. That is, the time that the RTT communication takes to travel from the mobile communication device to the AP and from the AP back to the communication device, excluding any processing time. The processing time may be the time that the AP takes to the process the received RTT communication and send a response back to the mobile communication device. In some embodiments, the processing time may also include the processing time at the mobile communication device, both before sending the RTT communication and after receiving a response to the RTT communication. However, for purposes of this disclosure, "processing time" may refer only to the processing time at the AP. Typically, the processing times, and ultimately response times as a result thereof, for each AP have an amount of variability. APs from some manufacturers or specific AP models may have less response time variability than APs from other manufacturers or other AP models. In some cases, different APs of the same manufacturer and model may also have response time variability.

In some embodiments, the response time variability may be determined by placing a mobile communication device at a known specific location within a Wi-Fi geospace. The mobile communication device may be used to send multiple RTT communications (or ping requests) to a target AP. The response time variability may be determined by calculating the processing time (at the AP) of the RTT communication. That is, the time between after the AP receives the RTT communication and prior to sending a response to the RTT communication. The processing time excludes any "over-the-air" time or signal time of the RTT communication. The response time variability of the AP may be determined based on the variability of the processing times for each of the multiple RTT communications (or ping requests) sent to the AP from the mobile communication device. The variability may be calculated using a standard deviation calculation. A rank and/or weight may be assigned to the AP based on the amount of response time variability determined for the AP. For example, an AP having low response time variability may be assigned a higher rank and/or a higher weight. Similarly, an AP having high response time variability may be assigned a lower rank and/or a lower weight.

In some embodiments, the rank and/or weight assigned to the Wi-Fi APs may be based on an AP's media access control (MAC) address. Some AP manufacturers may inherently have less response time variability with their APs than those of other manufacturers. By determining the manufacturer of an AP by decoding the manufacturer field in an AP's MAC address, a rank and/or weight may be assigned to the AP based on information previously known about the response time variability of APs from that manufacturer. For example, an AP from a manufacturer known to have low response time variability may be assigned a higher rank and/or a higher weight. Similarly, an AP from a manufacturer having high response time variability may be assigned a lower rank and/or a lower weight.

In some embodiments, more than one AP may be used for determining a position of the mobile communication device. As such, RTT communications may be sent to more than one AP within the Wi-Fi geospace. In such cases, the number of APs out of the total number of currently deployed APs within the Wi-Fi geospace that may need to be used for accurate position determination may be based on the assigned weights of each of the APs. For example, if 10 APs exist within the Wi-Fi geospace, only 3 APs having high weights (low response time variability) assigned to them may be needed to obtain an accurate position determination using RTT communications.

FIG. 1 illustrates a simplified block diagram of a mobile communication device 100 that may incorporate one or more embodiments. Mobile communication device 100 includes a processor 110, display 130, input device 140, speaker 150, memory 160, wireless transceiver 170, and computer-readable medium 190.

Processor 110 may be any general-purpose processor operable to carry out instructions on the mobile communication device 100. The processor 110 is coupled to other units of the mobile device 100 including display 130, input device 140, speaker 150, memory 160, wireless transceiver 170, and computer-readable medium 190.

Display 130 may be any device that displays information to a user. Examples may include an LCD screen, CRT monitor, or seven-segment display.

Input device 140 may be any device that accepts input from a user. Examples may include a keyboard, keypad, or mouse.

Speaker 150 may be any device that outputs sound to a user. Examples may include a built-in speaker or any other device that produces sound in response to an electrical audio signal.

Memory 160 may be any magnetic, electronic, or optical memory. Memory 160 includes two memory modules, module 1 162 and module 2 164. It can be appreciated that memory 160 may include any number of memory modules. An example of memory 160 may be dynamic random access memory (DRAM).

Wireless transceiver 170 may be any transmitter/receiver configured to send and receive wireless signals. The wireless transceiver may be operable to send and receive the wireless signals in a format specified by a wireless specification, e.g. Wi-Fi. In some embodiments, wireless transceiver 170 may be used for sending an RTT communication to an AP and for receiving a response to the RTT communication from the AP.

Computer-readable medium 190 may be any magnetic, electronic, optical, or other computer-readable storage medium. Computer-readable storage medium 190 includes database access module 192 and RTT module 194.

Database access module 192 is configured to access a Wi-Fi AP database. The Wi-Fi AP database may include information about currently deployed APs within a Wi-Fi geospace. The information may include, but is not limited to: AP number, AP MAC address, make/model of the AP, RTT response time variability of the AP, AP rank, and AP weight. The mobile communication device 100 may select one or more APs from the Wi-Fi AP database for position determination using RTT communications based on the information in the Wi-Fi AP database.

RTT module 194 is configured to send and receive RTT communications. The RTT module 194 may send and receive the RTT communications via wireless transceiver 170, as described above. RTT module 194 may be responsible for all facets of the RTT communication including generation of the packet used for the RTT communication and analyzing the received response to the RTT communication.

AP Selection module 196 is configured to select an access point based on rank and/or weight information about the access point. AP selection module 196 may interface with database access module 192 to receive the database contents retrieved by the database access module 192. AP selection module 196 may select the APs having higher rank and/or weight attributes to be used for position determination using RTT communications.

Distance calculation module 198 is configured to calculate a distance between the mobile communication device 100 and an AP within a Wi-Fi geospace. The calculated distance may be based on a response time to the RTT communication initiated by RTT module 194. For example, the distance between the mobile communication device 100 and an AP may be based on the AP's response time to the RTT communication and the speed of the light.

Position determination module 199 is configured to determine a position of the mobile communication device 100. The position determination module 199 may determine the device's 100 position based on the distance calculation by distance calculation module 198. Since the locations of the APs are known and accessible by database access module 192, position determination module 199 may determine the position since the device's 100 distance from the AP is also known (as determined by distance calculation module 198).

Figure 2:
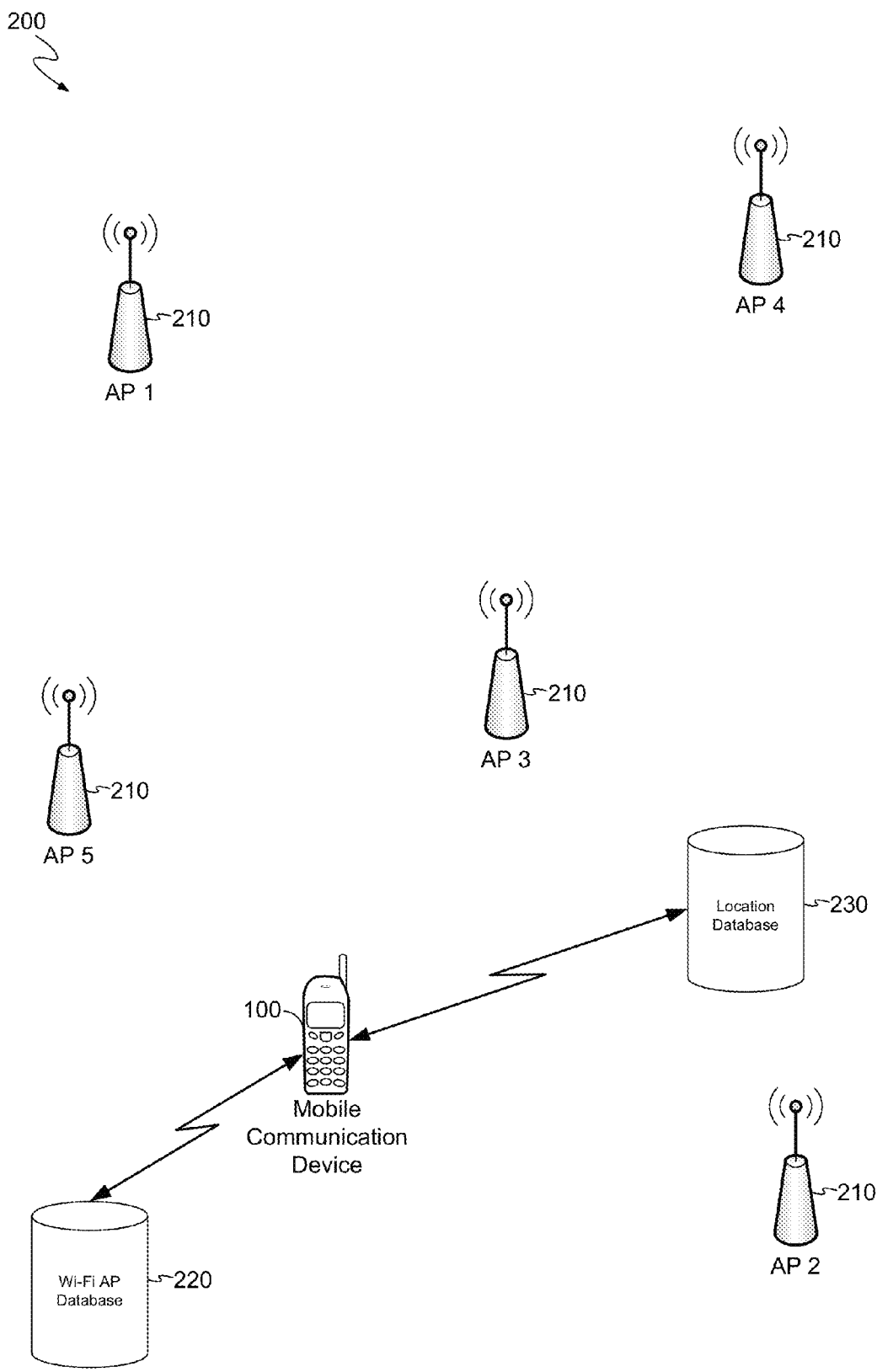
FIG. 2 illustrates a Wi-Fi geospace including a plurality of access points, a mobile communication device, and a Wi-Fi AP database, in accordance with some embodiments.

FIG. 2 illustrates a Wi-Fi geospace 200 including a plurality of access points 210, a mobile communication device 100, a location database 230, and a Wi-Fi AP database 220, in accordance with some embodiments. The Wi-Fi geospace 200 includes five access points 210 which may be used with a WLAN positioning system to determine a position of the mobile communication device 100. In some embodiments, the Wi-Fi AP database 220 may be an online database accessible, for example, via a website or online server. In other embodiments, the Wi-Fi AP database 220 may be stored locally within memory 160 (FIG. 1) of mobile communication device 100. For purposes of discussion herein, mobile communication device 100 can be any suitable Wi-Fi enabled device including, for example, a cell phone, a PDA, a tablet computer, a laptop, or the like. Location database 230 is operable to store location information about the currently deployed APs 210 within the Wi-Fi geospace 200.

The APs 210, which are well-known wireless access points (e.g., operating according to the IEEE 802.11 family of standards), are each assigned a unique MAC address that is programmed therein by the manufacturer of the AP. Each MAC address, which is also commonly referred to as the "burned-in address" or the organizationally unique identifier (OUI), typically includes six bytes of data. The first three bytes of the MAC address identify which organization manufactured the AP device (e.g., whether the AP made by Qualcomm, Inc., by Cisco Systems Inc., etc.), and are assigned to organizations by IEEE. As described below, the manufacturer information obtained from the AP's MAC address may be used to determine to assign a rank and/or weight to each AP 210 within the Wi-Fi geospace 200.

It can be appreciated that any of the APs 210, or a combination of more than one AP 210, within the Wi-Fi geospace 200 may be used for position determination of the mobile communication device 100. The position may be determined using RTT communication methods described above. In order to determine which of the APs 210 may be used for providing the most accurate position determination, the Wi-Fi AP database 220 may be queried to obtain information about the APs 210 within the Wi-Fi geospace 200. The information may include, but is not limited to: AP number, AP MAC address, make/model of the AP, RTT response time variability of the AP, AP rank, and AP weight.

As described above, each AP 210 has an RTT response time variability attributed to processing time variability. Not knowing the RTT response time variability of the APs 210 undesirably leads to inaccuracies in determining the exact location of the mobile communication device 100 using WLAN positioning systems because of variations in the RTT response time variability of different make and models of APs 210.

Thus, in accordance with present embodiments, the Wi-Fi AP database 220 is populated with RTT response time variability information about the APs. The Wi-Fi AP database is also populated with a rank and/or weight assigned to each AP based on the RTT response time variability. The RTT response time variability may be predetermined based on manufacturer information obtainable from the MAC address (also stored within the Wi-Fi AP database 220) of the AP or may be measured.

Population of the Wi-Fi AP database 220 with RTT response time variability information a plurality of different APs 210 can be performed by individually measuring the RTT response time variability of a selected number of such APs 210. In some embodiments, the response time variability may be determined by placing the mobile communication device 100 at a known specific location within a Wi-Fi geospace 200. The mobile communication device 100 may be used to send multiple RTT communications (or ping requests) to a target AP 210. The response time variability may be determined by calculating the processing time (at the AP 210) of the RTT communication. That is, the time between after the AP 210 receives the RTT communication and prior to sending a response to the RTT communication. The processing time excludes any "over-the-air" time or signal time of the RTT communication. The response time variability of the AP 210 may be determined based on the variability of the processing times for each of the multiple RTT communications (or ping requests) sent to the AP 210 from the mobile communication device. The variability may be calculated using a standard deviation calculation. A rank and/or weight may be assigned to the AP 210 based on the amount of response time variability determined for the AP 210. For example, an AP 210 having low response time variability may be assigned a higher rank and/or a higher weight. Similarly, an AP 210 having high response time variability may be assigned a lower rank and/or a lower weight.

Once the Wi-Fi AP database 220 is sufficiently populated with entries, the RTT response time variability, rank, and/or weight can be retrieved by the mobile communication device 100 for a selected AP 210 by performing a look-up within the Wi-Fi AP database 220. The lookup value may be based on the MAC address of the AP 210 or a specific AP number of the AP 210. For example, the plurality of APs 210 within the Wi-Fi geospace 200 of FIG. 2 have the following AP numbers: AP 1, AP 2, AP 3, AP 4, and AP 5. Once the mobile communication device 100 retrieves the information about the AP 210 from the Wi-Fi AP database 220, the mobile communication device 100 can select one or more APs 210 to use for WLAN positioning using RTT communications. The selection may be based on the rank and/or weight assigned to the specific APs 210. The mobile communication device 100 may select the APs 210 that would provide the most accuracy for location determination.

For example, to determine the location of mobile device 100 within the Wi-Fi geospace 200 via trilateration techniques, using the locations of the APs 210 as fixed position references, the mobile communication device 100 first detects the presence of the APs 210 within the Wi-Fi geospace. The mobile communication device 100 may then use the MAC addresses of the APs or the AP numbers to retrieve the geographic locations of the access points from the location database 230. As mentioned above, the location database 230 can be provided be companies such as Google©, Skyhook©, Devicescape©, and WiGLE™, or can be stored within the mobile communication device 100. Then, in accordance with present embodiments, mobile communication device 100 uses the MAC addresses of the APs 210 or the AP numbers to retrieve previously measured or previously known (from manufacturer information) RTT response time variability information, assigned rank, and/or weight of the APs 210 from the Wi-Fi AP database 220. Once the exact locations and the RTT response time variability information, assigned rank, and/or weight of the APs 210 are known, the mobile communication device 100 can select one or more APs from the Wi-Fi geospace 200 that would provide the most accuracy for determining the distance between itself and each of the APs using RTT communications.

For example, when using RTT communications to calculate distances between the mobile communication device 100 and APs 210, the RTT associated with each AP 210 includes a signal propagation time (or "over-the-air" time) ($t_{pn}$) and a processing delay time ($t_{del}$), where RTT=+$t_{pn}$+$t_{del}$. The signal propagation time $t_{pn}$ is the summation of the travel time of a request signal transmitted from the mobile communication device 100 to the access point 210 and the travel time of a response signal transmitted from the access point 210 back to the mobile communication device 100. The distance (d) between the mobile communication device 100 and the selected AP 210 can be expressed as:

$$d = c*t_{pn}/2 = c*(RTT-t_{del})/b\ 2 \quad (1)$$

where c is the speed of light. For some embodiments, the value of RTT can be measured by the mobile communication device 100 a plurality of times to generate an average RTT value ($RTT_{av}$), in which case the value of RTT is used in Equation (1) instead of a single measured value RTT.

In accordance with present embodiments, the value for the processing delay time $t_{del}$, which is specific to the make-and-model of the selected AP 210, typically varies between various make-and-models of APs 210. Furthermore, the processing delay time $t_{del}$ may have some degree of variability, meaning that the value of $t_{del}$ may not be consistent for every RTT communication. Some APs may have less RTT response time variability than others. Due to the RTT response time variability, the distance (d) between the mobile communication device 100 and the selected access points 210 may not be accurate. By querying the Wi-Fi AP database 220, as described above, the mobile communication device 100 may select the APs 210 having lower RTT response time variability to obtain a more accurate distance (d) determination, and ultimately location determination.

Figure 3:
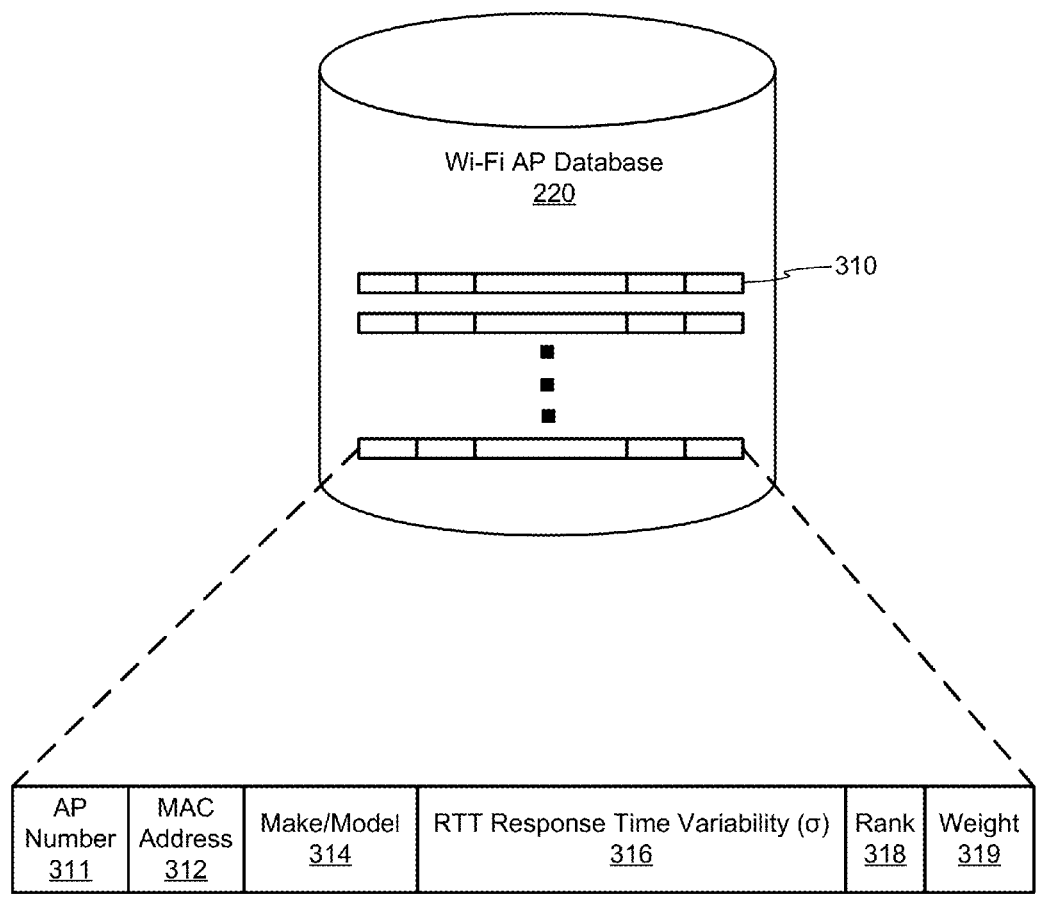
FIG. 3 illustrates one embodiment of the Wi-Fi AP database, in accordance with some embodiments.

FIG. 3 illustrates one embodiment of the Wi-Fi AP database 220, in accordance with some embodiments. The Wi-Fi AP database 220 includes a plurality of entries 310, each of which corresponds to either a specific access point identified by a corresponding MAC address or AP number. The Wi-Fi AP database 220 may also include (or alternatively is associated with) a processor (not shown) that can be used to retrieve entries 310 in response to a MAC address or AP number provided to the Wi-Fi AP database 220 as a look-up value.

Each entry 310 is shown FIG. 3 to include an AP number 311, a MAC address field 312, a make-and-model field 314, an RTT response time variability field 316, a rank field 318, and a weight field 319. For other embodiments, each entry 310 can include other fields to store additional information about the corresponding AP and/or a corresponding group of APs having similar (if not identical) characteristics. For some embodiments, the Wi-Fi AP database 220 can provide its services through a website or one or more application programming interfaces (APIs) to interested third parties (e.g., mobile communication devices).

The AP number field 311 contains the number of the AP within the Wi-Fi geospace. The AP number may be unique to each specific AP within the Wi-Fi geospace and dynamically assigned by the WLAN system.

The MAC address field 312 contains either the MAC address corresponding to a specific AP or a range of MAC addresses corresponding to a group of APs estimated to have similar characteristics.

The make-and-model field 314 can include information identifying the corresponding AP or groups of APs (e.g., the manufacturer, the particular type or product name of the AP, and so on).

The RTT response time variability field 316 contains either measured values or predetermined values (based on manufacturer and product information) of RTT response time variability of a specific AP. The RTT response time variability may be expressed in terms of standard deviations. As described above, the RTT response time variability may be measured by a mobile communication device. More specifically, the processing delay time $t^{del}$ for a selected make-and-model of access point can be calculated from a measured value of RTT if the exact distance (d) between the mobile communication device and the selected AP is known, where:

$$t_{del} = RTT - 2d/c \quad (2)$$

The rank field 318 can include ranking information about the corresponding AP or group of APs. The rank may indicate the accuracy of WLAN positioning when using the AP and may be based on the RTT response time variability. For example, APs having less RTT response time variability may be assigned a higher rank, and vice versa. An AP may be selected for WLAN positioning based on its assigned rank.

The weight field 319 can include an assigned weight for a specific AP. The weight may also indicate the accuracy of the WLAN positioning when using the AP and may be based on the RTT response time variability. For example, APs having less RTT response time variability may be assigned a higher weight, and vice versa. An AP may be selected for WLAN positioning based on its assigned weight. In some embodiments, the weight may be on a scale of 1-10.

Figure 4:
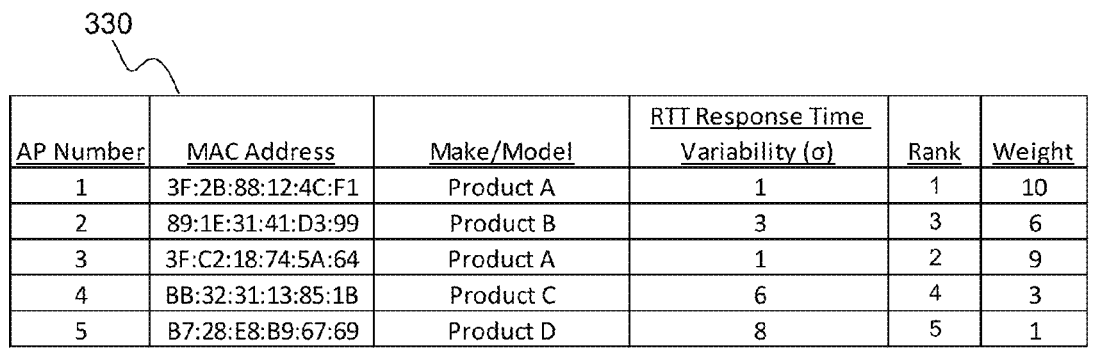
FIG. 4 illustrates exemplary entries of the Wi-Fi AP database, in accordance with some embodiments.

FIG. 4 illustrates exemplary entries 330 of the Wi-Fi AP database, in accordance with some embodiments. The first entry shows information about AP number 1 including a single MAC address that corresponds to product A, the RTT response time variability value of 1 standard deviation, a rank of 1, and a weight of 10. This indicates that Product A has a low RTT response time variability (only 1 standard deviation) and thereby has a high rank and high weight. AP Number 1 may be a likely candidate for selection by the mobile communication device for WLAN positioning using RTT communications.

The second entry shows information about AP number 2 including a single MAC address that corresponds to product B, the RTT response time variability value of 3, a rank of 3, and a weight of 6. This indicates that product B has a mediocre RTT response time variability (3 standard deviations) and thereby has a medium rank and medium weight. AP Number 2 may only be a likely candidate for selection if no other higher ranked/weighted candidate is available for selection by the mobile communication device for WLAN positioning using RTT communications.

The third entry shows information about AP number 3 including a single MAC address that corresponds to product A, the RTT response time variability value of 1, a rank of 2, and a weight of 9. This indicates that product A has a low RTT response time variability (1 standard deviation) and thereby has a high rank and high weight. AP Number 1 may be a likely candidate for selection by the mobile communication device for WLAN positioning using RTT communications. AP Number 3 is also the same product (product A) as AP number 1, and therefore it is not surprising that the RTT response time variability is low.

The fourth entry shows information about AP number 4 including a single MAC address that corresponds to product C, the RTT response time variability value of 6, a rank of 4, and a weight of 3. This indicates that product C has a high RTT response time variability (6 standard deviations) and thereby has a low rank and low weight. AP Number 4 may not be a likely candidate for selection by the mobile communication device for WLAN positioning using RTT communications due to its low rank and low weight.

The fifth entry shows information about AP number 5 including a single MAC address that corresponds to product D, the RTT response time variability value of 8, a rank of 5, and a weight of 1. This indicates that product D has a very high RTT response time variability (8 standard deviations) and thereby has a lower rank and lower weight. AP Number 5 may not be a likely candidate for selection by the mobile communication device for WLAN positioning using RTT communications due to its low rank and low weight.

As mentioned above, for some embodiments, the Wi-Fi AP database can be dynamically updated with new entries new entries generated by a mobile communication device of the type described above with respect to FIG. 1. In this manner, users of the Wi-Fi AP database can continuously scan the Wi-Fi geospace for access points and update the Wi-Fi AP database with additional and/or refined entries.

In other embodiments, the Wi-Fi AP database can use the MAC addresses and/or make-and-model information stored therein to obtain additional information related to corresponding access points from other databases (e.g., location database of FIG. 2 or a manufacturer's website). The additional information may include boot-up time; channel specification; such as 1×1, 2×2, or 3×3 channels; and the 802.11 standard specification such as a, b, g, or n.

Figure 5:
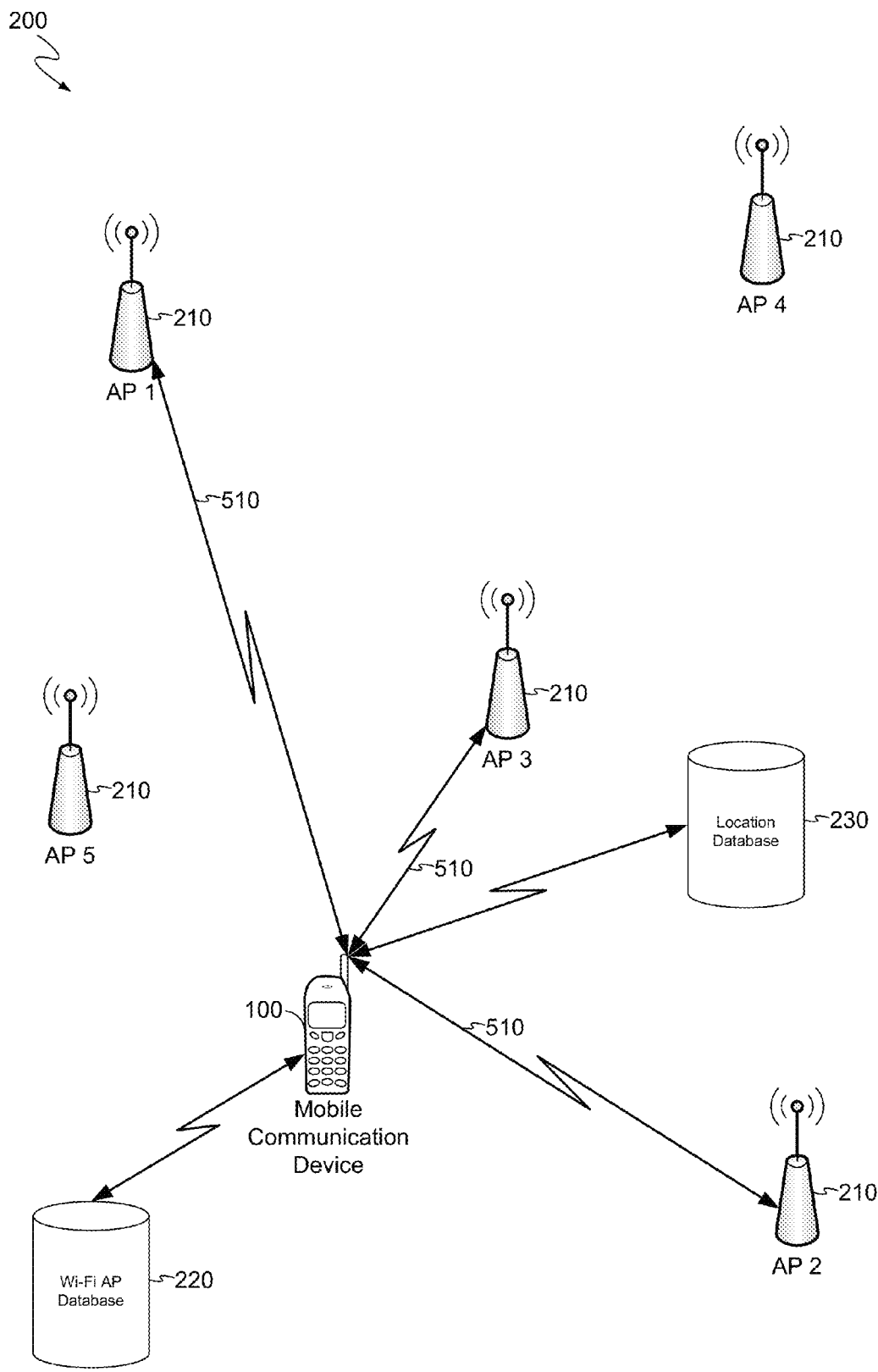
FIG. 5 illustrates the mobile communication device sending and receiving RTT communications to and from a subset of the plurality of APs of FIG. 2, in accordance with some embodiments.

FIG. 5 illustrates the mobile communication device 100 sending and receiving RTT communications 510 to and from a subset of the plurality of APs 210 of FIG. 2, in accordance with some embodiments. FIG. 5 is similar to FIG. 2 except that it illustrates which of the APs 210 are selected by the mobile communication device 100 for WLAN positioning using RTT communications. As demonstrated in FIG. 4, AP Numbers 1, 2, and 3 have higher ranks and weights assigned to them than the other APs 210 within the Wi-Fi geospace 200. As such, in this example, mobile communication device 100 has chosen AP Numbers 1, 2, and 3 for WLAN positioning using RTT communications.

It can be appreciated that while FIG. 5 shows three APs 210 being selected and used for WLAN positioning, a single AP 210 or any number of APs 210 may be used for WLAN positioning using RTT communications within the Wi-Fi geospace 200. In some embodiments, the number of APs 210 used for WLAN positioning may be based on the weights assigned to the APs 210. For example, if several APs 210 having higher weights assigned to them are available within the Wi-Fi geospace 200, a lower number of APs 210 may be needed for accurate WLAN positioning and vice versa. A formula incorporating the weights assigned to the APs to determine how many APs 210 may be needed for WLAN positioning may be used in making the selections. Additionally, the weights may be assigned to the APs 210 according to a predetermined formula.

The mobile communication device 100 may send RTT communications to AP Numbers 1, 2, and 3. In response, AP Numbers 1, 2, and 3 may send a response to the RTT communication back to the mobile communication device 100. Based on the RTT of the RTT communication, mobile communication device 100 may determine its position within the Wi-Fi geospace 200 using the methods described above. Since the locations of the APs 210 are known and stored within location database 230, mobile communication device 100 may determine its position using the RTT of the RTT communication.

Figure 6A:
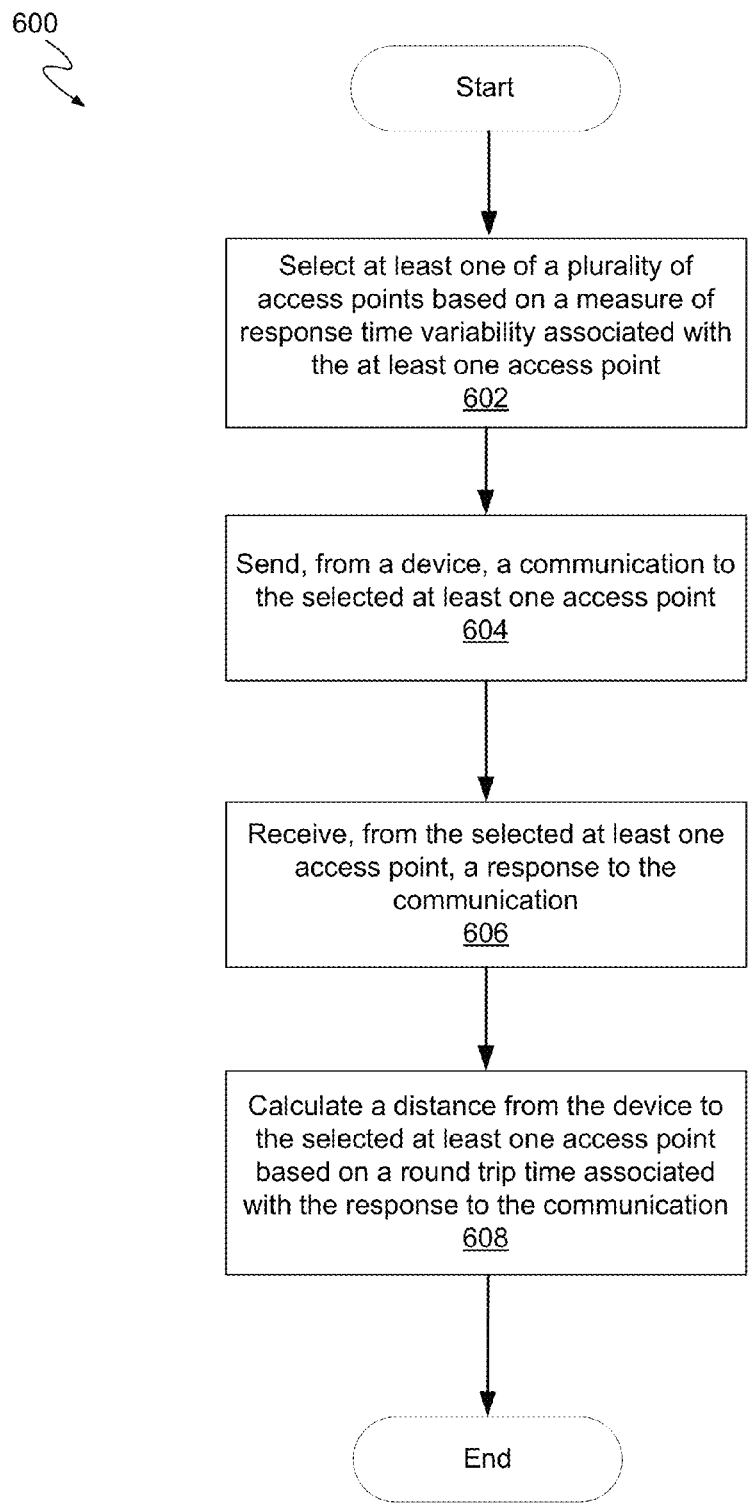
FIG. 6A is an illustrative flow chart depicting an exemplary operation for dynamically selecting a Wi-Fi AP for position determination.

FIG. 6A is an illustrative flow chart 600 depicting an exemplary operation for dynamically selecting a Wi-Fi AP for position determination. In block 602, at least one of a plurality of access points may be selected. The selection may be based on a measure of response time variability associated with the at least one access point. In some embodiments, the response time includes a signal time and a processing time, wherein the response time variability is attributed to a variance in the processing time. The variance in the processing time may be determined using a standard deviation calculation. In some embodiments, the response time variability is determined using a standard deviation calculation. In some embodiments, the rank and weight may be based on a MAC address of the access point, from which manufacturer and product information about the AP may be determined For example, in FIG. 5, three APs within the Wi-Fi geospace are selected. The selection is made based on an assigned rank and weight of each AP, which in turn are based on the response time variability associated with each AP. The rank, weight, and response time variability of each AP may be retrieved by the device from a Wi-Fi AP database.

In block 604, a communication is sent from a device to the selected at least one access point. The communication may be a RTT communication where a ping request is sent from the device to access point. For example, in FIG. 5, the mobile communication device sends a RTT communication to three of the five access points within the Wi-Fi geospace.

In block 606, a response to the communication, from the selected at least one access point, is received. The response to the communication may be a response to the RTT communication sent by the device to the access point. The response may be sent by the access point after it has processed the received the RTT communication sent by the device. For example, in FIG. 5, the mobile communication device receives a response to the RTT communication from three of the five access points within the Wi-Fi geospace.

In block 608, a distance from the device to the selected at least one access point is calculated based on a round trip time associated with the response to the communication. In some embodiments, the locations of the access point(s) are stored within a location database. The mobile communication device can query the location database to obtain the access point location information. After receiving a response to the RTT communication, the mobile communication device may determine the RTT. As described above, using the RTT, speed of light and known locations of the access point(s), the mobile device communication device may calculate its distance to the access point(s). In some embodiments, the method further includes determining a position of the device based at least in part on the calculating. For example, in FIG. 5, the mobile communication device may determine its position within the Wi-Fi geospace based on a RTT to three of the five APs within the Wi-Fi geospace.

Figure 6B:
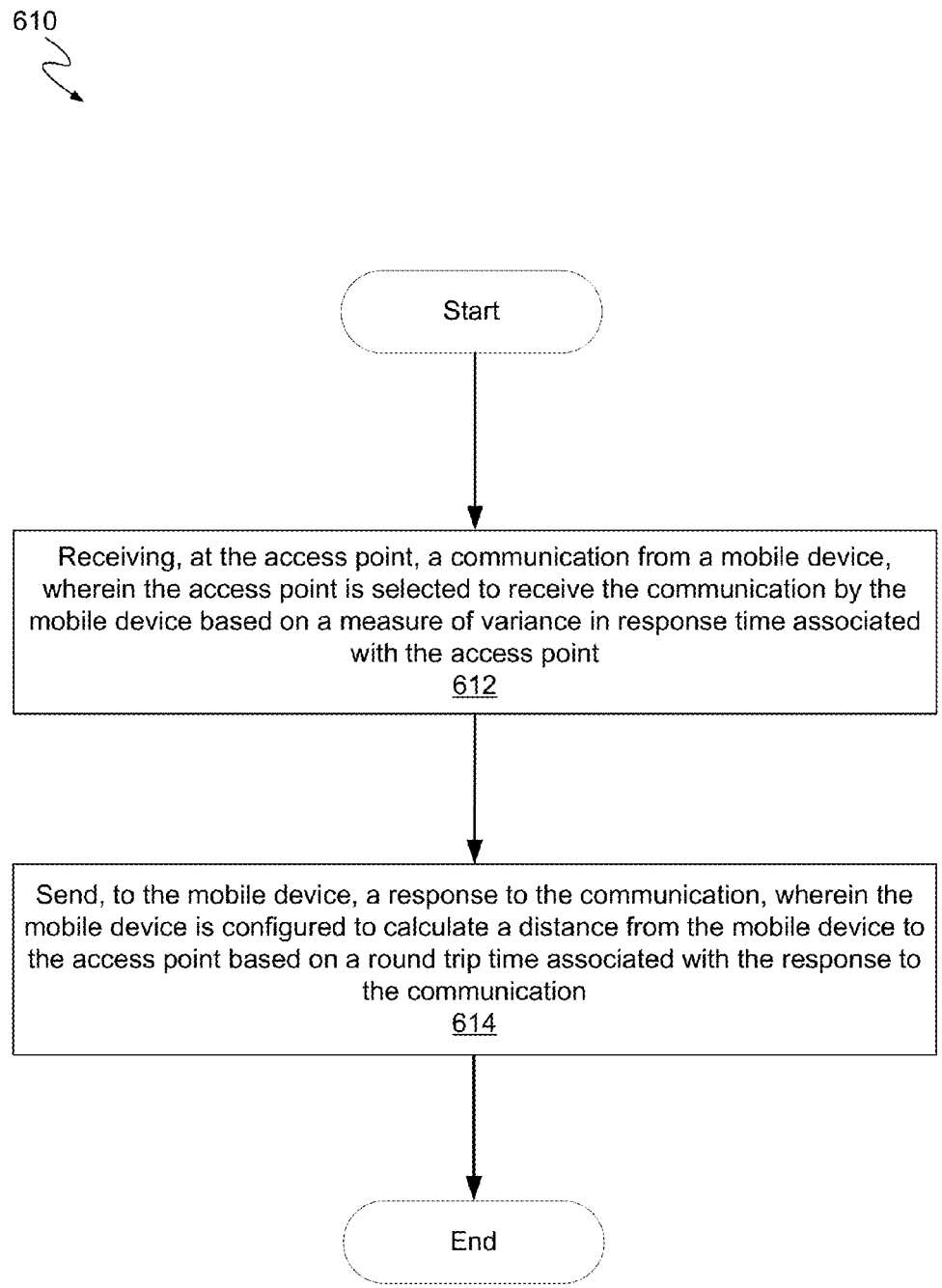
FIG. 6B is an illustrative flow chart depicting an exemplary operation for responding to a RTT communication.

FIG. 6B is an illustrative flow chart 610 depicting an exemplary operation for responding to a RTT communication. In block 612, a communication from a mobile device is received at an access point, wherein the access point is selected to receive the communication by the mobile device based on a measure of variance in response time associated with the access point. The communication from the mobile device may be sent via the RTT module of FIG. 1.

In some embodiments, selecting the access point includes querying a database including at least one of information about the at least one access point, an assigned weight of the access point, and the variance in response time. The access point may be queried via the database access module of FIG. 1.

In some embodiments, the response time includes a signal time and a processing time, and the variance in response time is attributed to a variance in the processing time.

In block 614, a response to the communication is sent to the mobile device, wherein the mobile device is configured to calculate a distance from the mobile device to the access point based on a round trip time associated with the response to the communication. The mobile device may receive the communication via the RTT module of FIG. 1.

Figure 6C:
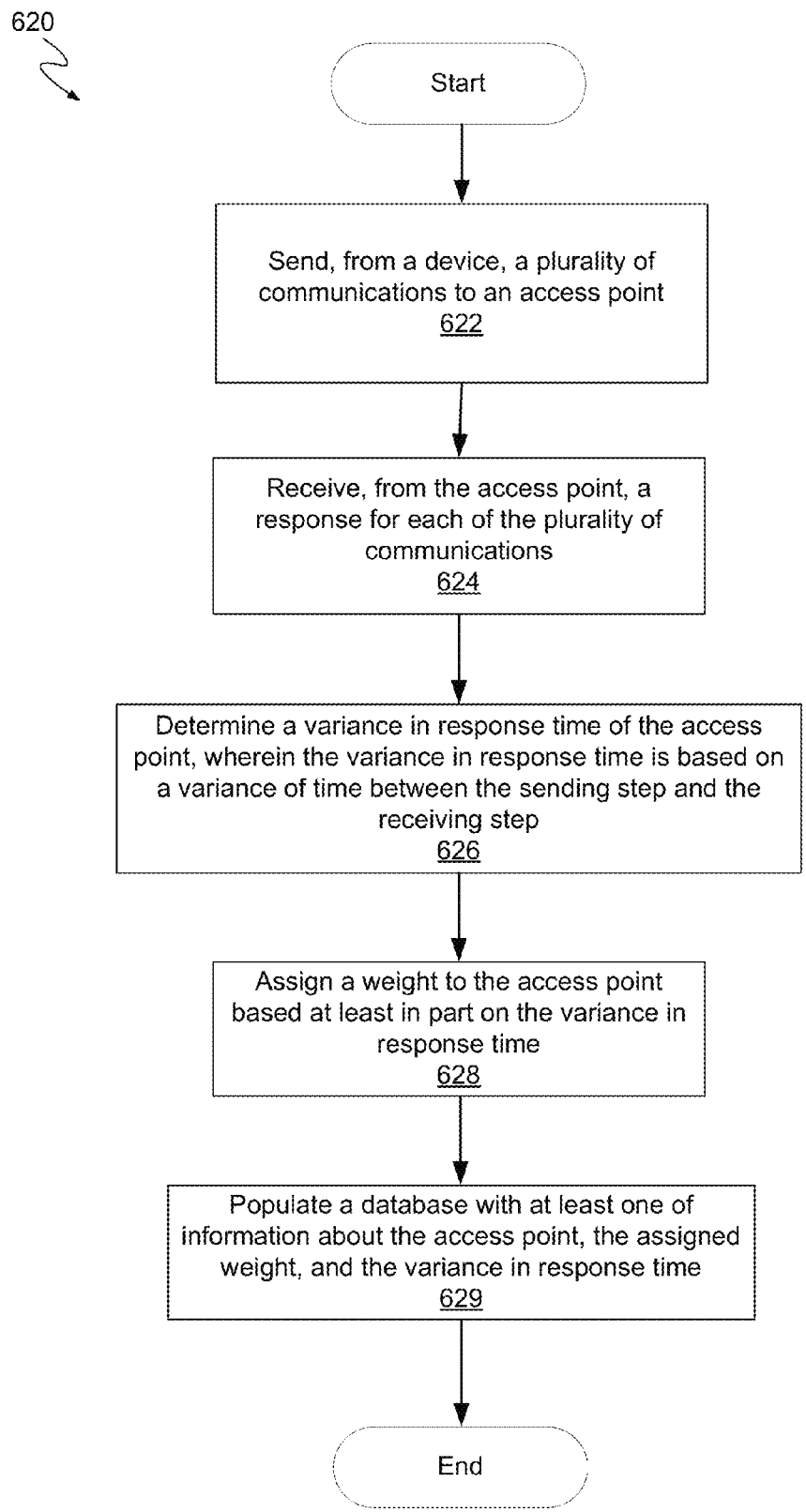
FIG. 6C is an illustrative flow chart depicting an exemplary operation for creating a Wi-Fi AP database.

FIG. 6C is an illustrative flow chart 620 depicting an exemplary operation for creating a Wi-Fi AP database. In block 622, a plurality of communications is sent from a device to an access point. The communications may be RTT communications and sent using the RTT module of FIG. 1.

In block 624, a response for each of the plurality of communications is received from the access point. The response may be received by the RTT module of FIG. 1.

In block 626, a variance in response time of the access point is determined, wherein the variance in response time is based on a variance of time between the sending step and the receiving step.

In block 628, a weight is assigned to the access point based at least in part on the variance in response time.

In block 630, a database is populated with at least one of information about the access point, the assigned weight, and the variance in response time. The database may be populated using the database access module of FIG. 1.

In some embodiments, the variance in response time is determined using a standard deviation calculation.

In some embodiments, the response time includes a signal time and a processing time, and the response time variability is attributed to a variance in the processing time.

In some embodiments, the information includes at least of an identifier corresponding to the access point, a MAC address corresponding to the access point, and manufacturer information corresponding to the access point.

Figure 7:
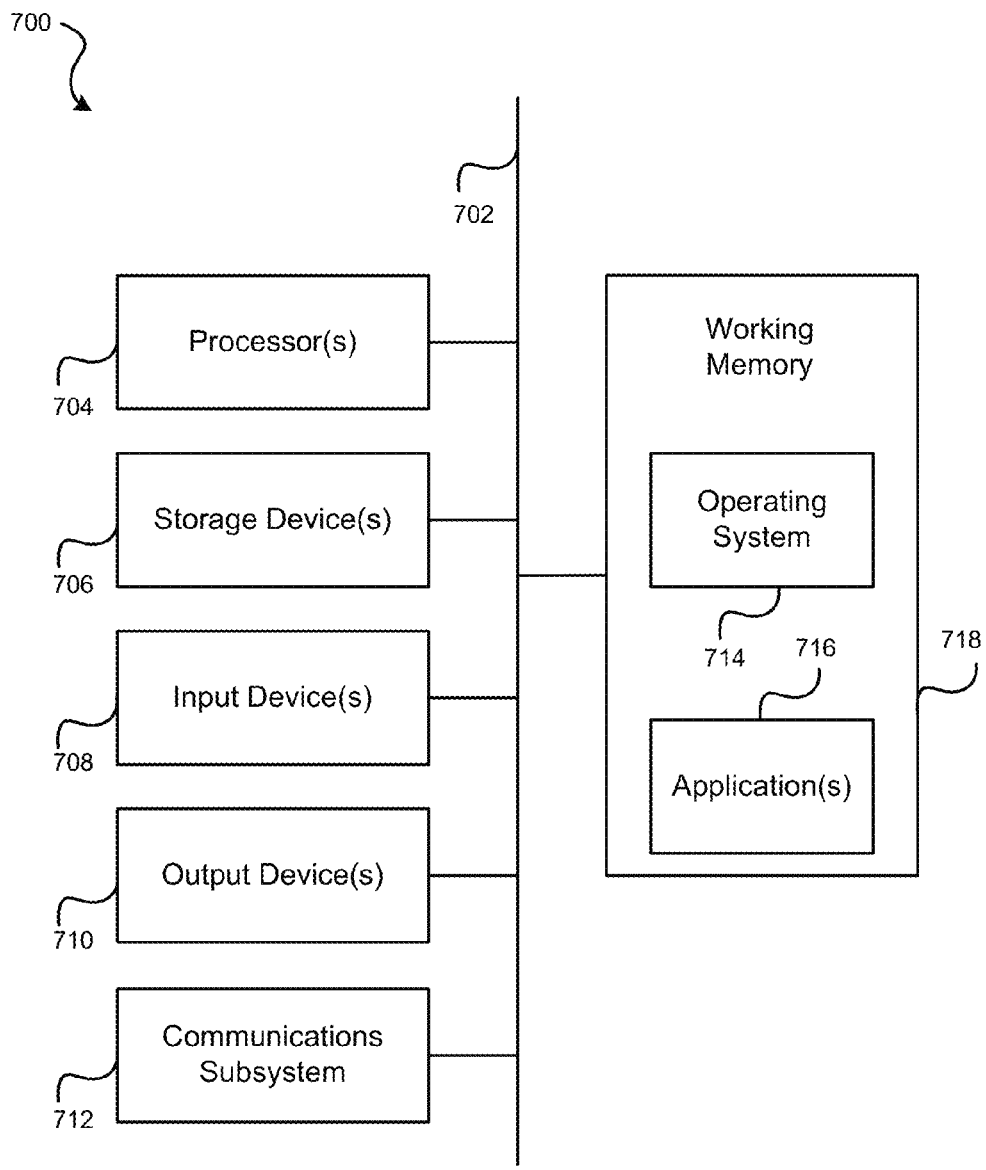
FIG. 7 illustrates an example of a computing system in which one or more embodiments may be implemented.

FIG. 7 illustrates an example of a computing system in which one or more embodiments may be implemented. A computer system as illustrated in FIG. 7 may be incorporated as part of the above described computerized device. For example, computer system 700 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 7 provides a schematic illustration of one embodiment of a computer system 700 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 7 is meant only to provide a generalized illustration of various components, any or all of which may be utilized as appropriate. FIG. 7, therefore, broadly illustrates how individual system elements may be implemented in a relatively separated or relatively more integrated manner. In some embodiments, computer system 700 may be used to housing the Wi-Fi AP database of FIG. 2, the location database of FIG. 2, or both.

The computer system 700 is shown comprising hardware elements that can be electrically coupled via a bus 702 (or may otherwise be in communication, as appropriate). The hardware elements may include one or more processors 704, including without limitation one or more general-purpose processors and/or one or more special-purpose processors (such as digital signal processing chips, graphics acceleration processors, and/or the like); one or more input devices 708, which can include without limitation one or more cameras, sensors, a mouse, a keyboard, a microphone configured to detect ultrasound or other sounds, and/or the like; and one or more output devices 710, which can include without limitation a display unit such as the device used in embodiments of the invention, a printer and/or the like.

In some implementations of the embodiments of the invention, various input devices 708 and output devices 710 may be embedded into interfaces such as display devices, tables, floors, walls, and window screens. Furthermore, input devices 708 and output devices 710 coupled to the processors may form multi-dimensional tracking systems.

The computer system 700 may further include (and/or be in communication with) one or more non-transitory storage devices 706, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 712, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 712 may permit data to be exchanged with a network, other computer systems, and/or any other devices described herein. In many embodiments, the computer system 700 will further comprise a non-transitory working memory 718, which can include a RAM or ROM device, as described above.

The computer system 700 also can comprise software elements, shown as being currently located within the working memory 718, including an operating system 714, device drivers, executable libraries, and/or other code, such as one or more application programs 716, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 706 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 700 may be omitted or may be implemented separate from the illustrated system. For example, the processor 704 and/or other elements may be implemented separate from the input device 708. In one embodiment, the processor is configured to receive images from one or more cameras that are separately implemented.

In some embodiments, elements in addition to those illustrated in FIG. 7 may be included in the computer system 700.

Some embodiments may employ a computer system (such as the computer system 700) to perform methods in accordance with the disclosure. For example, some or all of the procedures of the described methods may be performed by the computer system 700 in response to processor 704 executing one or more sequences of one or more instructions (which might be incorporated into the operating system 714 and/or other code, such as an application program 716) contained in the working memory 718. Such instructions may be read into the working memory 718 from another computer-readable medium, such as one or more of the storage device(s) 706. Merely by way of example, execution of the sequences of instructions contained in the working memory 718 might cause the processor(s) 704 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 700, various computer-readable media might be involved in providing instructions/code to processor(s) 704 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 706. Volatile media include, without limitation, dynamic memory, such as the working memory 718. Transmission media include, without limitation, coaxial cables, copper wire and fiber optics, including the wires that comprise the bus 702, as well as the various components of the communications subsystem 712 (and/or the media by which the communications subsystem 712 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 704 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 712 (and/or components thereof) generally will receive the signals, and the bus 702 then might carry the signals (and/or the data, instructions, etc. carried by the signals) to the working memory 718, from which the processor(s) 704 retrieves and executes the instructions. The instructions received by the working memory 718 may optionally be stored on a non-transitory storage device 706 either before or after execution by the processor(s) 704.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 704—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for selecting a Wi-Fi access point for position determination, comprising:
   obtaining, by a mobile device, data comprising a measure of variance in response time associated with each of a plurality of access points;
   selecting, by the mobile device, at least one of the plurality of access points for use in a communication for a distance determination, the selecting based on the obtained data, the selected at least one access point having a lower variance in response time than one or more other access points among the plurality of access points;
   sending, by the mobile device, a communication to the selected at least one access point;
   receiving, by the mobile device, from the selected at least one access point, a response to the communication; and
   calculating, by a mobile device, a distance from the device to the selected at least one access point based on a round trip time determined based on the communication and the response to the communication.

2. The method of claim 1, further comprising providing data for inclusion in a database, the providing comprising:
   sending, from the mobile device, a plurality of communications to one or more access points;
   receiving, from the one or more access points, a response for each of the plurality of communications; and
   providing, by the mobile device, for inclusion in the database at least one of information about the at least one access point, an assigned weight, and a variance in response time.

3. The method of claim 1, wherein the obtaining comprises querying a database to obtain the data.

4. The method of claim 2, wherein a lower variance in response time corresponds to a higher weight and a higher variance in response time corresponds to a lower weight.

5. The method of claim 2, wherein the information comprises at least one of an identifier corresponding to the access point, a MAC address corresponding to the access point, or manufacturer information corresponding to the access point.

6. The method of claim 1, wherein the response time comprises a signal time and a processing time, and wherein the variance in response time is attributed to a variance in the processing time.

7. The method of claim 6, wherein the variance in the processing time is determined using a standard deviation calculation.

8. The method of claim 1, further comprising determining a position of the device based at least in part on the calculating.

9. An apparatus for selecting a Wi-Fi access point for position determination, comprising:
   a transceiver configured to send and receive a communication;
   a processor coupled to the transceiver;
   the processor configured to:
   obtain data comprising a measure of variance in response time associated with each of a plurality of access points;
   select at least one of the plurality of access points for use in a communication for a distance determination, the selecting based on the obtained data, the selected at least one access point having a lower variance in response time than one or more other access points among the plurality of access points;
   send, via the transceiver, a communication to the selected at least one access point;
   receive, via the transceiver, a response to the communication; and
   calculate a distance from the apparatus to the selected at least one access point based on a round trip time determined based on the communication and the response to the communication.

10. The apparatus of claim 9, wherein the processor is further configured to provide data for inclusion in a database, the providing comprising:
    sending, via the transceiver, a plurality of communications to one or more access points;
    receiving, via the transceiver, from the one or more access points, a response for each of the plurality of communications; and
    providing for inclusion in the database at least one of information about the at least one access point, an assigned weight, and a variance in response time.

11. The apparatus of claim 9, wherein the obtaining comprises querying a database to obtain the data.

12. The apparatus of claim 10, wherein a lower variance in response time corresponds to a higher weight and a higher variance in response time corresponds to a lower weight.

13. The apparatus of claim 10, wherein the information comprises at least one of an identifier corresponding to the access point, a MAC address corresponding to the access point, or manufacturer information corresponding to the access point.

14. The apparatus of claim 9, wherein the response time comprises a signal time and a processing time, and wherein the variance in response time is attributed to a variance in the processing time.

15. The apparatus of claim 14, wherein the variance in the processing time is determined using a standard deviation calculation.

16. The apparatus of claim 9, wherein the processor is further configured to determine a position of the apparatus based at least in part on the calculating.

17. A device for selecting a Wi-Fi access point for position determination, comprising:
    means for obtaining, by a mobile device, data comprising a measure of variance in response time associated with each of a plurality of access points;
    means for selecting, by the mobile device, at least one of the obtained plurality of access points for use in a communication for a distance determination, the selecting based on the obtained data, the selected at least one access point having a lower variance in response time than one or more other access points among the plurality of access points;
    means for sending, by the mobile device, a communication to the selected at least one access point;
    means for receiving, by the mobile device and from the selected at least one access point, a response to the communication; and
    means for calculating, by the mobile device, a distance from the device to the selected at least one access point based on a round trip time determined based on the communication and the response to the communication.

18. The device of claim 17, further comprising means for providing data for inclusion in a database, the means for providing comprising:
    means for sending, from the mobile device, a plurality of communications to one or more access points;

means for receiving, from the one or more access points, a response for each of the plurality of communications; and means for providing, by the mobile device, for inclusion in the database with at least one of information about the at least one access point, an assigned weight, and a variance in response time.

19. The device of claim 17, wherein the obtaining comprises querying a database to obtain the data.

20. The device of claim 18, wherein a lower variance in response time corresponds to a higher weight and a higher variance in response time corresponds to a lower weight.

21. The device of claim 18, wherein the information comprises at least one of an identifier corresponding to the access point, a MAC address corresponding to the access point, or manufacturer information corresponding to the access point.

22. The device of claim 17, wherein the response time comprises a signal time and a processing time, and wherein the variance in response time is attributed to a variance in the processing time.

23. The device of claim 22, wherein the variance in the processing time is determined using a standard deviation calculation.

24. The device of claim 17, further means for comprising determining a position of the device based at least in part on the calculating.

25. A processor-readable non-transitory medium comprising processor readable instructions configured to cause a processor to:

obtain, by a mobile device, data comprising a measure of variance in response time associated with each of a plurality of access points;

select, by the mobile device, at least one of the plurality of access points for use in a communication for a distance determination, the selecting based on the obtained data, the selected at least one access point having a lower variance in response time than one or more access points among the plurality of access points;

send, by the mobile device, a communication to the selected at least one access point;

receive, by the mobile device, from the selected at least one access point, a response to the communication; and calculate, by the mobile device, a distance from the device to the selected at least one access point based on a round trip time determined based on the communication and the response to the communication.

26. The processor-readable non-transitory medium of claim 25 wherein the instructions are further configured to cause the processor to provide data for inclusion in a database, the providing comprising:

sending, from the mobile device, a plurality of communications to one or more access points;

receiving, from the one or more access points, a response for each of the plurality of communications; and providing, by the mobile device, for inclusion in the database at least one of information about the at least one access point, an assigned weight, and a variance in response time.

27. The processor-readable non-transitory medium of claim 25, wherein the obtaining comprises querying a database to obtain the data.

28. The processor-readable non-transitory medium of claim 26, wherein a lower variance in response time corresponds to a higher weight and a higher variance in response time corresponds to a lower weight.

29. The processor-readable non-transitory medium of claim 26, wherein the information comprises at least one of an identifier corresponding to the access point, a MAC address corresponding to the access point, or manufacturer information corresponding to the access point.

30. The processor-readable non-transitory medium of claim 25, wherein the response time comprises a signal time and a processing time, and wherein the variance in response time is attributed to a variance in the processing time.

31. The processor-readable non-transitory medium of claim 30, wherein the variance in the processing time is determined using a standard deviation calculation.

32. The processor-readable non-transitory medium of claim 25, wherein the instructions are further configured to cause the processor to determine a position of the device based at least in part on the calculating.

* * * * *